United States Patent [19]
Reh et al.

[11] 3,997,655
[45] Dec. 14, 1976

[54] PROCESS FOR CATALYTICALLY REACTING GASES HAVING A HIGH SO₂ CONTENT

[75] Inventors: Lothar Reh, Bergen-Enkheim; Karl-Heinz Dörr, Mainz; Hugo Grimm, Frankfurt am Main; Karel Vydra, Bad Nauheim, all of Germany

[73] Assignee: Metallgesellschaft Aktiengesellschaft, Frankfurt am Main, Germany

[22] Filed: Sept. 30, 1975

[21] Appl. No.: 618,192

Related U.S. Application Data

[63] Continuation of Ser. No. 343,619, March 21, 1973, abandoned.

[30] Foreign Application Priority Data

Mar. 21, 1972  Germany .......................... 2213579

[52] U.S. Cl. ................................ 423/533; 423/522
[51] Int. Cl.² ..................................... C01B 17/76
[58] Field of Search ... 423/521, 522, 528, 532–538

[56] References Cited

UNITED STATES PATENTS

| | | | |
|---|---|---|---|
| 1,789,460 | 1/1931 | Clark | 423/533 |
| 3,656,900 | 4/1972 | Dreshsel et al. | 423/533 |
| 3,755,549 | 8/1973 | Guth | 423/533 |
| 3,780,166 | 12/1973 | Drechsel | 423/533 |
| 3,803,297 | 4/1974 | Guth et al. | 423/522 |

FOREIGN PATENTS OR APPLICATIONS

| | | | |
|---|---|---|---|
| 2,026,818 | 12/1971 | Germany | 423/533 |
| 1,054,431 | 4/1959 | Germany | 423/533 |
| 504,635 | 7/1930 | Germany | 423/533 |
| 47-32,506 | 8/1972 | Japan | 423/522 |
| 258,974 | 10/1926 | United Kingdom | 423/533 |

Primary Examiner—Earl C. Thomas
Assistant Examiner—Gary P. Straub
Attorney, Agent, or Firm—Burgess, Dinklage & Sprung

[57] ABSTRACT

Gases having a high SO₂ content are catalytically reacted in a contacting zone having a plurality of series-connected contacting trays. A partial stream of partly reacted gases from the contacting zone containing SO₃ is admixed with the SO₂ containing gas before entering the first contacting tray. The gases are subjected to interstage cooling between contacting trays. At least a portion of the partly reacted gases is passed through an absorber prior to mixing with the feed stock gas having a high SO₂ content. The rate at which SO₃ is absorbed is increased in dependence on the loss of catalyst activity in the contacting zones such that the conversion of SO₂ to SO₃ in the contacting trays remains approximately constant.

1 Claim, 1 Drawing Figure

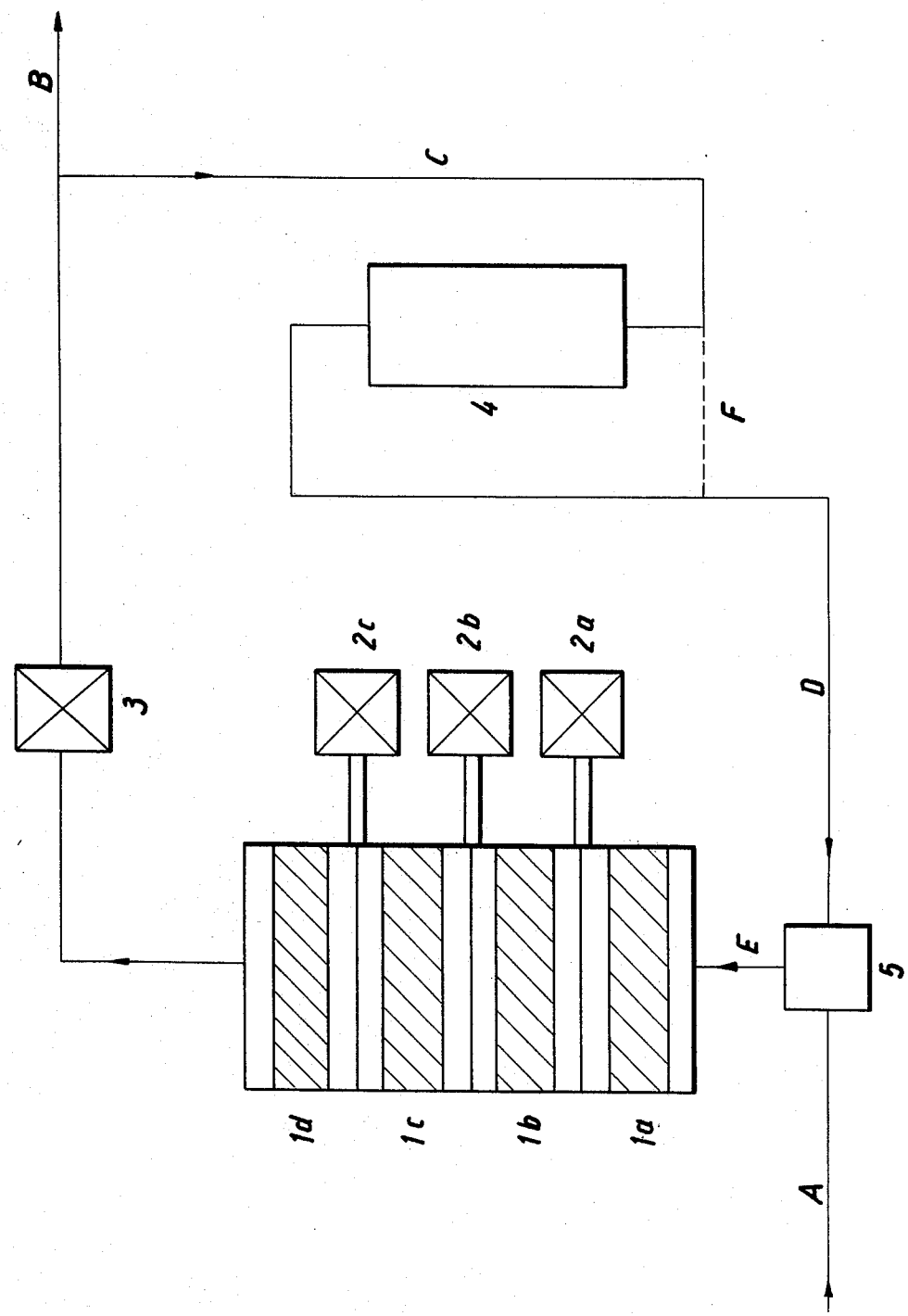

1

PROCESS FOR CATALYTICALLY REACTING GASES HAVING A HIGH SO₂ CONTENT

This is a continuation of application Ser. No. 343,619, filed Mar. 21, 1973, now abandoned.

BACKGROUND

This invention relates to a process for catalytically reacting gases having a high $SO_2$ content in contacting plants having a plurality of series-connected contacting trays, wherein a partial stream of partly reacted gases containing $SO_3$ is admixed with the $SO_2$-containing gas before entering the first contacting tray, and the gases are subjected to interstage cooling between contacting trays.

During the reaction of $SO_2$-containing gases to form $SO_3$, which is subsequently used to produce sulfuric acid, the catalyst must be heated first by the gas to the so-called initiation temperature. This initiation temperature depends on the composition of the catalyst and on the process by which it has been made and, e.g., with catalysts based on vanadium pentoxide ($V_2O_5$) is about 400°–450° C. The reaction of $SO_2$ to form $SO_3$ results in a temperature rise because the reaction is exothermic. With gases which contain up to about 11% $SO_2$, the reaction is arrested at temperatures of about 620° C., where the equilibrium of the reaction $SO_2 + \frac{1}{2} O_2 \rightleftharpoons SO_3$ is reached. With gases having a higher $SO_2$ content, the temperature continues to rise because the reaction reaches its equilibrium only at higher temperatures. However, the catalyst will deteriorate at temperatures above about 620° C.

To avoid overheating which deteriorates the catalyst, $SO_3$-containing gases have been admixed with the $SO_2$-containing gases before entering the first contacting tray. The admixed $SO_3$ retards the conversion of the $SO_2$ to $SO_3$ so that overheating will be avoided if the admixing and the residence time of the gases in the contacting trays are properly controlled (DAS 1,054,431, German Patent 504,635, DOS 2,026,818).

Because the catalyst loses activity in the course of time, particularly in the first contacting trays, the rate of the reaction $SO_2 + \frac{1}{2} O_2 \rightleftharpoons SO_3$ and the conversion of the gas to form $SO_3$ are reduced accordingly. In the treatment of gases containing less than about 11% $SO_2$, more catalyst may be used than is theoretically required. This is not possible, however, in the case of gases having a high $SO_2$ content (e.g. more than 11% $SO_2$) because the reaction must be interrupted before the temperature which is critical for the catalyst is reached, i.e., considerably before the equilibrium is reached (cf. U.S. Pat. No. 3,875,294 issued Apr. 1, 1975).

SUMMARY

It is an object of the invention to decrease the amount by which the conversion to $SO_3$ is reduced as a result of the loss in catalyst activity.

This object is accomplished according to the invention by passing at least a partial stream of branched-off partial stream of partly reacted gases containing $SO_3$ through an absorber before being admixed, and increasing the rate at which $SO_3$ is absorbed in dependence on the increase in loss in catalyst activity such that the conversion of $SO_2$ to $SO_3$ in the contacting trays remains approximately constant.

Preferably the entire partial stream which is branched off is conducted through the absorber. In this case, automatic control of branching off and admixing is not necessary.

DESCRIPTION OF THE DRAWING

The present invention will be more fully understood from the following descriptions and the accompanying drawing which is a schematic flow diagram of suitable apparatus for carrying out the invention.

DESCRIPTION

The invention will be explained more fully with reference to the drawing and to an example.

The contacting vessel 1 contains four contacting trays 1a to 1d. Interstage coolers 2a to 2c are connected between the contacting trays. A cooler 3 is shown, also an absorber 4 and a mixer 5. The stream A of gases having a high $SO_2$ content is supplied to the mixer 5. The stream E of the mixed gases is supplied into the contacting vessel 1 and passes in succession through the contacting trays 1a to 1d and the interstage coolers 2a to 2c. The stream B of the gas which has partly been reacted to form SO3 leaves the contacting vessel 1 and is cooled in the cooler 3. A partial stream C is branched from the stream B and supplied into the absorber 4, where $SO_3$ is removed from said partial stream at a controlled rate. The stream D which leaves the absorber 4 is supplied to the mixer 5 and is mixed therein with the stream A. A partial stream F of the partial stream C may by-pass the absorber 4 (this is indicated in dotted lines).

EXAMPLE

The stream A has a rate of 50,000 standard cubic meters per hour and a composition of
50% $SO_2$
30% $O_2$
balance $N_2$.
A partial stream C at a rate of 5000 standard cubic meters per hour is constantly branched off and is entirely or in part conducted through the absorber 4.

During the first year, no $SO_3$ is absorbed in the absorber 4. In that case, stream E contains 3.37% $SO_3$ and stream B contains 22.14% $SO_2$ and 37.14% $SO_3$.

In the second year, 30% $SO_3$ are absorbed in the absorber 4. In that case, stream E contains 2.33% $SO_3$ and stream B contains 22.41% $SO_2$ and 36.24% $SO_3$.

In the third year, 60% $SO_3$ are absorbed in the absorber 4. In that case, the stream E contains 1.32% $SO_3$ and the stream B contains 22.68% $SO_2$ and 35.56% $SO_3$.

In the fifth year, 100% $SO_3$ are absorbed in the absorber 4. In that case, the stream E contains no $SO_3$ and the stream B contains 23.03% $SO_2$ and 34.54% $SO_3$.

The total conversion in the plant remains virtually constant at 60%.

Stream B is subjected to further processing to recover $SO_3$ in a known manner.

The advantages of the invention reside in that the conversion to $SO_3$ is maintained virtually constant in spite of the activity loss of the catalyst and that the gas rates remain also virtually constant so that an optimum and simple operation is enabled. Besides, fluctuations of the gas composition of stream A can be compensated to a considerable extent.

Catalysts that can be used in the process of the invention are based on vanadium pentoxide and may be of commercial quality, for example as manufactured by BASF (Catalyst 04-10 and 04-11).

The catalyst bodies used in the examples consisted of Catalyst 04-11 manufactured by BASF.

What is claimed is:

1. In a process for the production of sulfur trioxide by the catalytic oxidation of a feed gas having a sulfur dioxide content of more than 11% in a contacting zone having a plurality of series-connected contacting trays wherein the reaction is interrupted before reaching the temperature at which the catalyst deteriorates and wherein a stream containing sulfur trioxide is supplied to the contacting zone, and the gases are subjected to interstage cooling between contacting trays, the improvement for controlling the amount of sulfur trioxide supplied to the contacting zone in dependence on catalyst activity which comprises branching off a partly reacted gas stream containing sulfur dioxide and sulfur trioxide from the contacting zone effluent, passing said branched-off stream to a sulfur trioxide absorber zone and increasing the rate at which $SO_3$ is absorbed in dependence on the increase in loss in catalyst activity such that the conversion of $SO_2$ to $SO_3$ in the contacting trays remains approximately constant, and admixing the effluent stream from the absorber zone with said feed gas before entering the first contacting tray.

* * * * *

UNITED STATES PATENT AND TRADEMARK OFFICE
CERTIFICATE OF CORRECTION

PATENT NO. : 3,997,655
DATED : December 14, 1976
INVENTOR(S) : Lothar REH et al

It is certified that error appears in the above-identified patent and that said Letters Patent are hereby corrected as shown below:

Col. 2, line 22, "SO3" should read -- $SO_3$ --.

Col. 2, line 46, "36.24" should read -- 36.34 --.

Signed and Sealed this

Thirty-first Day of May 1977

[SEAL]

Attest:

RUTH C. MASON
Attesting Officer

C. MARSHALL DANN
Commissioner of Patents and Trademarks